United States Patent
Oikawa

(10) Patent No.: US 8,788,869 B2
(45) Date of Patent: Jul. 22, 2014

(54) INTERCHANGEABLE LENS AND CAMERA BODY COMMUNICATING WHETHER DATA TRANSMISSION WAS NORMAL OR ABNORMAL

(75) Inventor: Masafumi Oikawa, Mitaka (JP)

(73) Assignee: Nikon Corporation, Tokyo (JP)

( * ) Notice: Subject to any disclaimer, the term of this patent is extended or adjusted under 35 U.S.C. 154(b) by 618 days.

(21) Appl. No.: 13/033,136

(22) Filed: Feb. 23, 2011

(65) Prior Publication Data

US 2012/0066539 A1  Mar. 15, 2012

(30) Foreign Application Priority Data

Sep. 9, 2010 (JP) ................................. 2010-202102
Dec. 29, 2010 (JP) ................................. 2010-294516

(51) Int. Cl.
*G06F 1/04* (2006.01)
*G06F 1/12* (2006.01)
*G06F 5/06* (2006.01)

(52) U.S. Cl.
USPC ........................................................ 713/600

(58) Field of Classification Search
USPC ........................................................ 713/600
See application file for complete search history.

(56) References Cited

U.S. PATENT DOCUMENTS 5,043,754 A *  8/1991  Aihara et al. .................. 396/129
5,089,843 A *  2/1992  Higashihara et al. ........... 396/95
5,669,022 A *  9/1997  Kadohara et al. .............. 396/111
6,336,754 B1 *  1/2002  Sato et al. ...................... 396/529
2010/0309342 A1 * 12/2010  Nagata ........................... 348/241

FOREIGN PATENT DOCUMENTS

JP   H 02-123879   5/1990
JP   A-2000-105402  4/2000

OTHER PUBLICATIONS

Sep. 25, 2012 Office Action issued in Japanese Patent Application No. 2010-294516 (with translation).

* cited by examiner

*Primary Examiner* — Mohammed Rehman
(74) *Attorney, Agent, or Firm* — Oliff PLC

(57) ABSTRACT

An interchangeable lens that can be detachably fitted to a camera body includes: a clock signal reception unit that receives a clock signal outputted from the camera body; a control command reception unit that receives a control command and data signal from the camera body, the control command and data signal being in synchrony with the clock signal, specifying a control command for the interchangeable lens and including type data specifying a type of the control command; a response generation unit that generates a response data signal including the type data on the basis of the control command and data signal; and a response transmission unit that transmits the response data signal to the camera body in synchrony with the clock signal received by the clock signal reception unit when a control command and data signal is received from the camera body in a next communication cycle.

9 Claims, 8 Drawing Sheets

CAMERA BODY SIDE PROCESSING DURING COMMAND AND DATA COMMUNICATION

INTERCHANGEABLE LENS SIDE PROCESSING DURING COMMAND AND DATA COMMUNICATION

INTERCHANGEABLE LENS AND CAMERA BODY COMMUNICATING WHETHER DATA TRANSMISSION WAS NORMAL OR ABNORMAL

INCORPORATION BY REFERENCE

The disclosures of the following priority applications are herein incorporated by references:
Japanese Patent Application No. 2010-202102 filed Sep. 9, 2010
Japanese Patent Application No. 2010-294516 filed Dec. 29, 2010

BACKGROUND OF THE INVENTION

1. Field of the Invention

The present invention relates to an interchangeable lens and to a camera body.

2. Description of Related Art

It is per se known to provide bidirectional communication between an interchangeable lens and a camera body by three wire type synchronous communication. With such a communication format that is implemented using three signal lines, one line is allocated to a clock signal, and the remaining two signal lines are allocated to communication from the lens to the body and to communication from the body to the lens. When the clock signal is output from the lens or from the body, the lens and the body both perform output of data simultaneously in synchrony with this clock signal. In other words, data transmission from the lens to the body and data transmission from the body to the lens are performed simultaneously. For example, an image-capturing device is described in Japanese Laid-Open Patent Publication 2000-105402 (Patent Document #1) that performs bidirectional communication of the type described above using a group of six contact points.

SUMMARY OF THE INVENTION

In Patent Document #1, there is no description relating to any countermeasures to be taken when transmission or reception has not been performed correctly due to a transmission error during communication or the like, and accordingly there have been problems related to the reliability of communication.

According to the 1st aspect of the present invention, an interchangeable lens that can be detachably fitted to a camera body, comprising: a clock signal reception unit that receives a clock signal outputted from the camera body; a control command reception unit that receives a control command and data signal from the camera body, the control command and data signal being in synchrony with the clock signal, specifying a control command for the interchangeable lens and including type data specifying a type of the control command; a response generation unit that generates a response data signal including the type data on the basis of the control command and data signal that has been received; and a response transmission unit that transmits the response data signal to the camera body in synchrony with the clock signal received by the clock signal reception unit when a control command and data signal is received from the camera body in a next communication cycle.

According to the 2nd aspect of the present invention, it is preferred that an interchangeable lens according to the 1st aspect further comprises: an anomaly detection unit that detects if the control command and data signal received by the control command reception unit is anomalous; and wherein if an anomaly has been detected by the anomaly detection unit in the control command and data signal that was received by the control command reception unit in the immediately previous communication set, the response generation unit generates the response data signal including anomaly data that specifies the anomaly, instead of the type data that was received in the immediately previous communication cycle.

According to the 3rd aspect of the present invention, it is preferred that in an interchangeable lens according to the 2nd aspect, two of the control command and data signals that are received successively by the control command reception unit are configured not to coincide the type data included in one of the control command and data signals with the type data included in another control command and data signal; and the anomaly data is the type data received by the control command reception unit during the communication cycle immediately previous to the immediately previous communication cycle.

According to the 4th aspect of the present invention, it is preferred that an interchangeable lens according to the 1st aspect further comprises: a control unit that performs predetermined control on the basis of the received control command and data signal; and wherein the response data signal includes control result data that specifies a result of control performed by the control unit on the basis of the control command and data received by the control command reception unit during the immediately previous communication cycle.

According to the 5th aspect of the present invention, it is preferred that in an interchangeable lens according to the 1st aspect, if the control command reception unit sequentially receives a plurality of the control command and data signals, the response generation unit generates a final response data signal including the type data specifying the type of a final control command and data signal among the plurality of control command and data signals; and the response transmission unit transmits the final response data signal to the camera body, in response to the clock signal received by the clock signal reception unit after the response generation unit has generated the final response data.

According to the 6th aspect of the present invention, it is preferred that in an interchangeable lens according to the 1st aspect, if the control command reception unit sequentially receives a plurality of the control command and data signals, the response generation unit does not perform generation of a response data signal on the basis of the type data specifying the type of the final control command and data signal among the plurality of control command and data signals.

According to the 7th aspect of the present invention, a camera body to that is fitted an interchangeable lens according to the 1st aspect comprises: a clock signal reception unit that transmits the clock signal to the interchangeable lens; a control command transmission unit that transmits the control command and data signal to the interchangeable lens in synchrony with the clock signal; a response reception unit that receives the response data signal from the interchangeable lens in synchrony with the clock signal; and a decision unit that, on the basis of the response data signal received by the response reception unit, makes a decision as to whether or not the control command and data signal that was transmitted by the control command transmission unit during the previous communication cycle was received normally.

According to the 8th aspect of the present invention, it is preferred that in a camera body according to the 7th aspect, if the decision unit decides that the control command and data signal that was transmitted by the control command transmission unit during the previous communication cycle was not received normally, the control command transmission unit transmits the control command and data signal to the interchangeable lens again.

According to the 9th aspect of the present invention, it is preferred that in a camera body according to the 7th aspect, if the control command transmission unit sequentially transmits a plurality of the control command and data signals to the interchangeable lens, the clock signal transmission unit transmits a clock signal to the interchangeable lens for receiving the response data after the transmission of the final control command and data signal of the plurality of control command and data signals.

According to the present invention, it is possible to enhance the reliability of communication.

DESCRIPTION OF PREFERRED EMBODIMENTS

Embodiment 1

Figure 1:
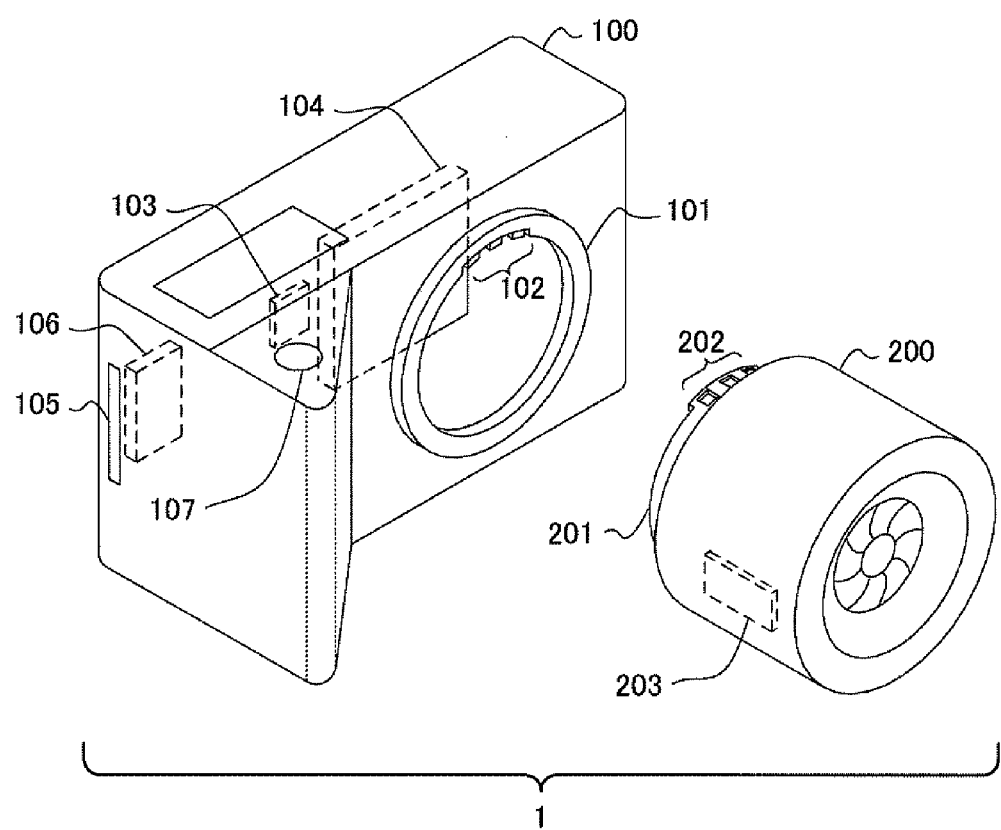
FIG. 1 is a perspective view showing the external appearance of a camera according to a first embodiment of the present invention.

FIG. 1 is a perspective view showing the external appearance of a camera system according to a first embodiment of the present invention. This camera system 1 includes a camera body 100 and an interchangeable lens 200. The interchangeable lens 200 is fitted to the camera body 100 so as to be detachable. The fitting of the interchangeable lens 200 to the camera body 100 is performed by setting a lens side lens mount 201 of the interchangeable lens 200 into a body side lens mount 101 of the camera body 100.

A contact point group 102 that includes a plurality of contact points for data communication and power supply is provided in the neighborhood of the body side lens mount 101. A contact point group 202 that includes a plurality of contact points, each corresponding to one of the contact points in the camera body side contact points group 102, is provided in the neighborhood of the lens side lens mount 201. When the interchangeable lens 200 is fitted to the camera body 100, the contact point group 102 and the contact point group 202 are connected together, and, along with electrical power for operating the interchangeable lens 200 being supplied to the interchangeable lens 200 from the camera body 100, also it becomes possible for data communication to be performed between the camera body 100 and the interchangeable lens 200, as will be described hereinafter.

A body CPU 103 is provided in the camera body 100. Control of various sections within the camera body 100 is performed by this body CPU 103 executing a predetermined control program. A lens CPU 203 is provided in the interchangeable lens 200. Control of various sections within the interchangeable lens 200 is performed by this lens CPU 203 executing a predetermined control program.

An imaging element 104 captures an image of a photographic subject and outputs an image capture signal. When a release switch 107 provided to the camera body 100 is pressed, the body CPU 103 performs various types of image processing upon this image capture signal, and creates image data. This created image data is stored on a transportable storage medium 106 that is loaded into a storage medium insertion slot 105.

Figure 2:
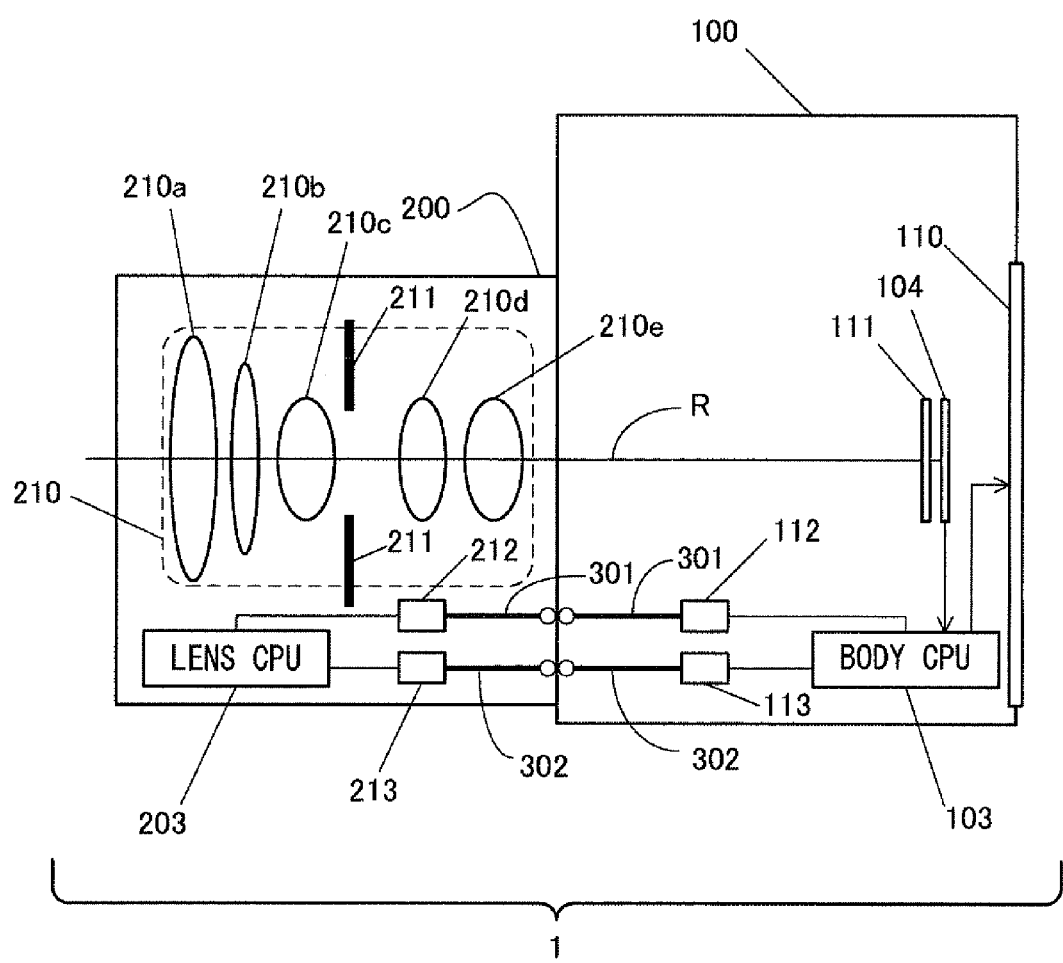
FIG. 2 is a sectional view showing the structure of a camera system 1 according to the first embodiment.

FIG. 2 is a sectional view showing the structure of this camera system 1 according to the first embodiment. The interchangeable lens 200 houses a photographic optical system 210 that includes a plurality of optical members 210a through 210e, and an iris diaphragm 211. This plurality of lenses includes a focusing lens 210c that performs focus adjustment of the photographic optical system 210 and a blur correction lens 210d that corrects for image blur of the image of the photographic subject. According to commands from the body CPU 103, with actuators (motors and so on) not shown in the figures, the lens CPU 203 drives the focusing lens 210c, the blur correction lens 210d, the iris diaphragm 211 and so on, so that these constitute driven members. The focusing lens 210c is driven along the optical axis R. And the blur correction lens 210d is driven along a horizontal axis and a vertical axis that are both orthogonal to the optical axis R, these being shift directions having components orthogonal to the direction of the optical axis. It should be understood that the blur correction lens 210d need not necessarily be shifted in this manner in directions exactly orthogonal to the optical axis R; the objective of blur correction can be attained provided that the directions in which the lens 210d can be shifted include components along this horizontal axis and this vertical axis, i.e. in directions that are orthogonal to the optical axis R. And the iris diaphragm 211 is driven so that the size of the aperture that it provides for allowing the light flux from the photographic subject to pass is variable (this aperture is centered upon the optical axis R).

It should be understood that it would also be acceptable for the interchangeable lens 200 to be built as a so-called power zoom lens, whose focal length can be varied as desired by electrically driving a focal length variation lens. In this case, along with providing this zoom lens (i.e., this focal length variation lens) within the interchangeable lens 200, also a zoom mechanism will be provided that makes it possible to drive this zoom lens electrically. And in this case the zoom lens is one of the driven members, and can be driven along the optical axis R.

Filters 111 are installed upon the front surface of the imaging element 104, including an optical low pass filter and an infrared cutoff filter. Light from the photographic subject that has passed through the photographic optical system 210 in the interchangeable lens 200 is centered around the optical axis R, and is incident upon the imaging element 104 through these filters 111. The body CPU 103 creates an image for display from the image capture signal output by the imaging element 104, and displays this image upon an LCD module 110 that is installed upon the rear surface of the camera body 100.

Two transmission sections are provided between the body CPU 103 and the lens CPU 203, in other words between the camera body 102 and the interchangeable lens 200, via a contact point group 102 and a contact point group 202 shown in FIG. 1. Since these two transmission sections are mutually independent, even if data is being transmitted via one of the transmission sections, it is still possible to data for transmission via the other transmission section. In the following explanation, these two transmission sections will be termed the first transmission section 301 and the second transmission section 302. Furthermore, communication that is performed by using the first transmission section 301 while the body CPU 103 and the lens CPU 203 respectively control a body side first communication circuit 112 and a lens side first communication circuit 212 will be termed "command and data communication", while communication that is performed using the second transmission section 302 while the body CPU 103 and the lens CPU 203 respectively control a body side second communication circuit 113 and a lens side second communication circuit 213 will be termed "hot line communication". The signal lines included in the first transmission section 301 and in the second transmission section 302, and also the concrete details of the information communicated via command and data communication and via hot line communication, will be described in detail hereinafter.

The body side first communication circuit 112 that performs command and data communication and the body side second communication circuit 113 that performs hot line communication are installed within the camera body 100. Each of these circuits is connected to the body CPU 103. In a similar manner, a lens side first communication circuit 212 that performs command and data communication and a lens side second communication circuit 213 that performs hot line communication are installed within the interchangeable lens 200. Each of these circuits is connected to the lens CPU 203.

To put it in another manner, the body side first communication circuit 112 and the body side second communication circuit 113 are both communication interfaces on the body side, while the lens side first communication circuit 212 and the lens side second communication circuit 213 are both communication interfaces on the interchangeable lens side. The body CPU 103 and the lens CPU 203 control the above described communication interfaces on their respective sides, so as to perform the two types of communication (i.e. command and data communication and hot line communication).

It should be understood that while, in this embodiment, the two communication interfaces (one for hot line communication and one for command and data communication) are provided separately and independently from one another, as an alternative, it would also be acceptable to arrange for these to be made as one unified interface. Furthermore, instead of the separate body CPU 103 and lens CPU 203, it would also be acceptable to utilize a single CPU that functions to control both of these communication interfaces.

The body side first communication circuit 112 and the lens side first communication circuit 212 are mutually connected together by the first transmission section 301. In a similar manner, the body side second communication circuit 113 and the lens side second communication circuit 213 are mutually connected together by the second transmission section 302.

It should be understood that, in the following explanation, the fact that the body CPU 103 controls the body side first communication circuit 112 so that it performs hot line communication is sometimes expressed as "the body CPU 103 performing hot line communication", while similarly the fact that the body CPU 103 controls the body side second communication circuit 113 so that it performs command and data communication is sometimes expressed as "the body CPU 103 performing command and data communication". The same holds for the lens CPU 203, the lens side first communication circuit 212, and the lens side second communication circuit 213.

Explanation of the Information Transmission Paths

Figure 3:
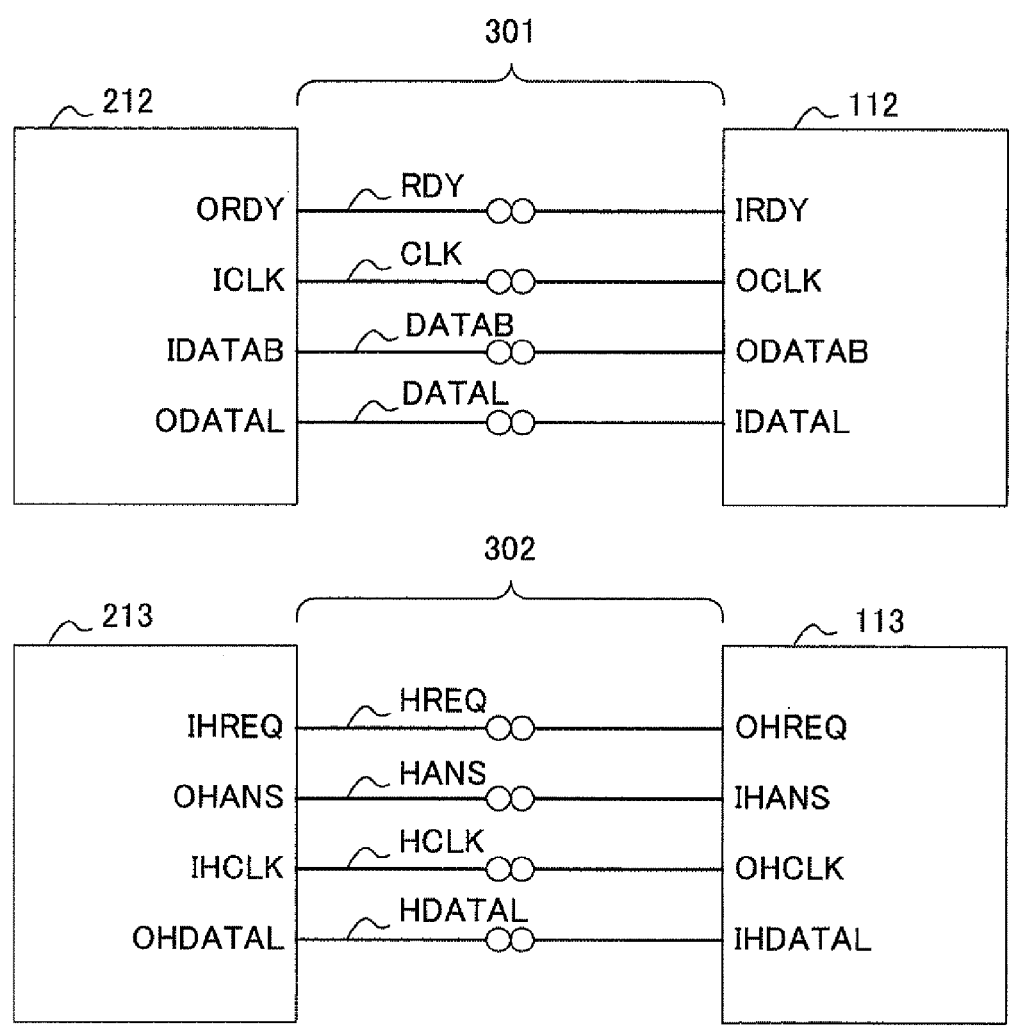
FIG. 3 is a block diagram showing certain details of an information transmission path between a camera body 100 and an interchangeable lens 200.

FIG. 3 is a block diagram showing the details of the information transmission paths between the camera body 100 and the interchangeable lens 200. The lens side first communication circuit 212 has four communication terminals ORDY, ICLK, IDATAB, and ODATAL. The body side first communication circuit 112 has four corresponding communication terminals IRDY, OCLK, ODATAB, and IDATAL. Moreover, the first transmission section 301 has four signal lines RDY, CLK, DATAB, and DATAL respectively connecting together these four pairs of communication terminals. In other words, the command and data communication is performed using these four signal lines.

A signal level that indicates whether or not it is possible to start communication is output to the signal line RDY from the lens CPU 203 and the lens side first communication circuit 212. A clock signal for data communication is output to the signal line CLK from the body side first communication circuit 112. A data signal is outputted to the signal line DATAB from the body CPU 103 and the body side first communication circuit 112. A data signal is output to the signal line DATAL from the lens CPU 203 and the lens side first communication circuit 212.

And the lens side second communication circuit 213 has four communication terminals IHEREQ, OHANS, IHCLK, and OHDATAL. Moreover, the body side second communication circuit 113 has four corresponding communication terminals OHREQ, IHANS, OHCLK, and IHDATAL. The second transmission section 302 has four signal lines HREQ, HANS, HCLK, and HDATAL respectively connecting together these four pairs of communication terminals. In other words, the hot line communication is performed using these four signal lines.

A signal (high or low level) for requesting the start of communication is output from the body CPU 103 and the body side second communication circuit 113 to the signal line HREQ. A signal (high or low level) indicating that preparations for communication have been completed is output from the lens CPU 203 and the lens side second communication circuit 213 to the signal line HANS. A clock signal for data communication is output from the body CPU 103 and the body side second communication circuit 113 to the signal line HCLK. A data signal is output from the lens CPU 203 and the lens side second communication circuit 213 to the signal line HDATAL.

Explanation of the Command and Data Communication

The command and data communication is bidirectional communication that is performed using the first transmission section 301. In this embodiment, it is arranged to perform this bidirectional communication by information communication from the camera body 100 to the interchangeable lens 200 using a dedicated unidirectional information transmission path, and also by performing information communication from the interchangeable lens 200 to the camera body 100 using a unidirectional information transmission path that is provided separately from the above information transmission path. In other words, the second transmission section 302 includes two unidirectional transmission paths, one unidirectional transmission path from the camera body to the lens, and another unidirectional transmission path from the lens to the camera body.

In this command and data communication, data transmitted from the body side first communication circuit 112 and data transmitted from the lens side first communication circuit 212 are synchronized to the same clock signal. In other words, data transmitted from the camera body 100 and data transmitted from the interchangeable lens 200 are transmitted simultaneously by the first transmission section 301. It should be understood that the body CPU 103 within the camera body 100 is adapted to perform command and data communication on a first predetermined cycle. Accordingly, the body side first communication circuit 112 generates a clock signal that is used by this command and data communication on the first predetermined cycle at a first predetermined frequency. Due to this, in the command and data communication, communication of information between the camera body 100 and the interchangeable lens 200 is performed on the first predetermined cycle.

Figure 4:
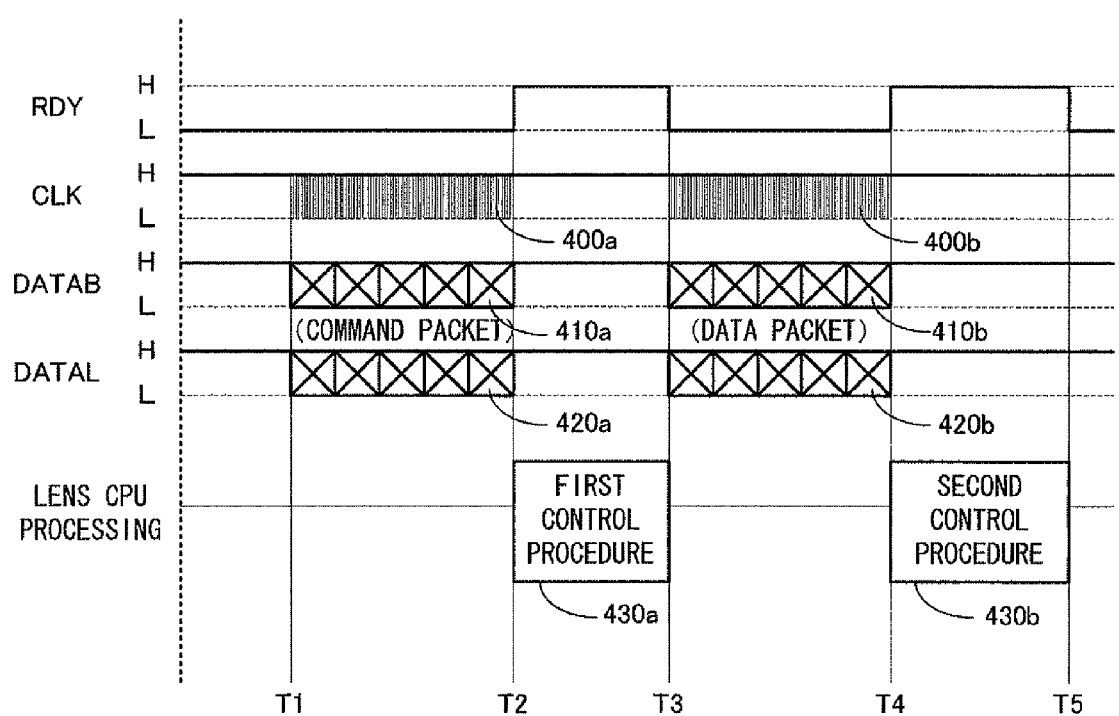
FIG. 4 is a timing chart showing an example of command and data communication.

FIG. 4 is a timing chart showing an example of this command and data communication. In the following, the procedure for command and data communication will be explained with reference to FIG. 4.

First, the body CPU 103 writes data to be transmitted to the lens CPU 203 by command and data communication (CMD data, LEN data, and data DATA1~DATAN that will be described hereinafter) into an internal buffer memory of the body side first communication circuit 112. When the writing of this data has been completed, the body CPU 103 outputs a transmit command signal to the body side first communication circuit 112. This transmit command signal is a signal that specifies a transmit command for the data described above. In response to this transmit command signal, the body side first communication circuit 112 starts the command and data communication.

When command and data communication starts (at T1), the body side first communication circuit 112 checks the signal level of the first signal line RDY. The signal level of the signal line RDY indicates whether or not communication with the lens side first communication circuit 212 is possible, and if the lens side first communication circuit 212 is in a state in which communication is not possible, then the signal line RDY is at H level (high level). Thus, if the signal line RDY is at H level, the body side first communication circuit 112 does not execute any further processing until the signal line RDY goes to L level.

When the signal line RDY is at L level (low level), the body side first communication circuit 112 transmits a body side command packet 410a (to be described in detail hereinafter) based upon the data written in the internal buffer memory to the lens side first communication circuit 212 via the signal line DATAB. In other words, a signal that specifies this body side command packet 410a is output to the signal line DATAB. In the following it will be supposed that, for transfer of data via a signal line, a signal specifying that data is transmitted on the signal line. Simultaneously with the body side first communication circuit 112 transmitting the body side command packet 410a, it also outputs a clock signal 400a on the signal line CLK. It should be understood that the number of pulses of this clock signal 400a is the number of pulses needed for the transmission of the body side command packet 410a. Since, in this embodiment, the size of the body side command packet 410a is four bytes (32 bits), the length of the clock signal 400a is 32 pulses.

Along with the lens side first communication circuit 212 receiving this body side command packet 410a via the signal line DATAB, it transmits a lens side command packet 420a (to be described in detail hereinafter) to the body side first communication circuit 112 via the signal line DATAL. The lens side first communication circuit 212 performs reception of the body side command packet 410a and transmission of the lens side command packet 420a in synchronization with the clock signal output by the body side first communication circuit 112. The size of the lens side command packet 420a is the same as the size of the body side command packet 410a. Accordingly, the transmission of the lens side command packet 420a is completed simultaneously with the completion of the transmission of the body side command packet 410a (at T2).

Upon the completion of transmission of the lens side command packet 420a, the lens side first communication circuit 212 raises the signal level of the signal line RDY to H level (at T2). And an interrupt indicating communication completed is generated to the lens CPU 203. Upon receipt of this interrupt, the lens CPU 203 starts a first control procedure 430a which consists of processing according to the contents of the body side command packet 410a that has been received. For example, if the body side command packet 410a that has been received has contents commanding the lens CPU 203 to transmit specified data, then, as this first control procedure, the lens CPU 203 executes processing to perform generation of that data.

When the lens CPU 203 completes this first control procedure 430a, it outputs a signal to the first communication circuit 212 that indicates that the first control procedure has been completed. In response to this signal, the lens side first communication circuit 212 lowers the signal level of the signal line RDY to L level (at T3). In response to this change of signal level, the body side first communication circuit 112, along with transmitting a body side data packet 410b (to be described in detail hereinafter) to the lens side first communication circuit 212 via the signal line DATAB, also outputs a clock signal 400b to the signal line CLK. It should be understood that the number of pulses in this clock signal 400b is the number of pulses needed for the transmission of the body side data packet 410b.

Along with receiving this body side data packet 410b via the signal line DATAB, the lens side first communication circuit 212 transmits a lens side data packet 420b (to be described in detail hereinafter) to the body side first communication circuit 112 via the signal line DATAL. The lens side first communication circuit 212 performs reception of the body side data packet 410b and transmission of the lens side data packet 420b in synchronization with the clock signal 400b output by the body side first communication circuit 112. The size of the lens side data packet 420b is the same as the size of the body side data packet 410b. Accordingly, the transmission of the lens side data packet 420b is completed (at T4) simultaneously with the completion of transmission of the body side data packet 410b.

When the lens side first communication circuit 212 has completed the transmission of the lens side data packet 420b, it raises the signal level of the signal line RDY to H level (at T4). And an interrupt indicating reception completed is generated to the lens CPU 203. Upon receipt of this interrupt, the lens CPU 203 starts a second control procedure 430b which consists of processing according to the contents of the body side command packet 410a and the contents of the body side data packet 410b that have been received. For example, if the body side command packet 410a that has been received has contents commanding the lens CPU 203 to drive the focusing lens 210c, and the body side data packet 410b that has been received has contents specifying an amount for the focusing lens 210c to be driven, then in this second control procedure 430b the lens CPU 203 executes processing to drive the focusing lens 210c by just that driven amount. When the lens CPU 203 has completed the second control procedure 430*b*, it outputs a signal to the lens side first communication circuit 212 indicating that the second control procedure has been completed. In response to this signal, the lens side first communication circuit 212 lowers the signal level of the signal line RDY to L level (at T5).

The communication that is performed from the time instant T1 to the time instant T5 described above constitutes one cycle of command and data communication. As described above, in one cycle of command and data communication, one each of a body side command packet 410*a* and a body side data packet 410*b* are transmitted by the body CPU 103 and the body side first communication circuit 112. In other words the body side command packet 410*a* and the body side data packet 410*b*, taken together, constitute a control command and data specifying a single control command for the interchangeable lens 200 (i.e. for the lens CPU 203).

In a similar manner, in one cycle of command and data communication, one each of a lens side command packet 420*a* and a lens side data packet 420*b* are transmitted by the lens CPU 203 and the lens side first communication circuit 212. In other words the lens side command packet 420*a* and the lens side data packet 420*b*, taken together, constitute response data specifying a single response to the camera body 100 (i.e. to the body CPU 103), although for the sake of convenience in processing the information is split into two packets.

Explanation of the Command Packets and Data Packets

Figure 5A:
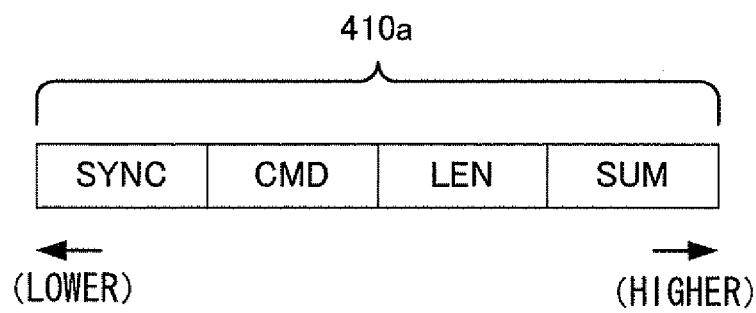
FIGS. 5A, 5B and 5C are figures showing the data structure of two packets transferred during command and data communication.
Figure 5B:
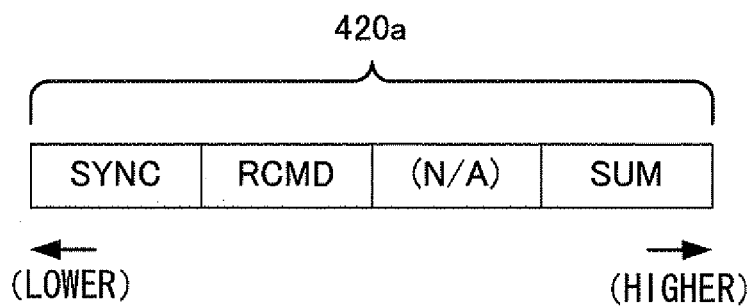
Figure 5C:
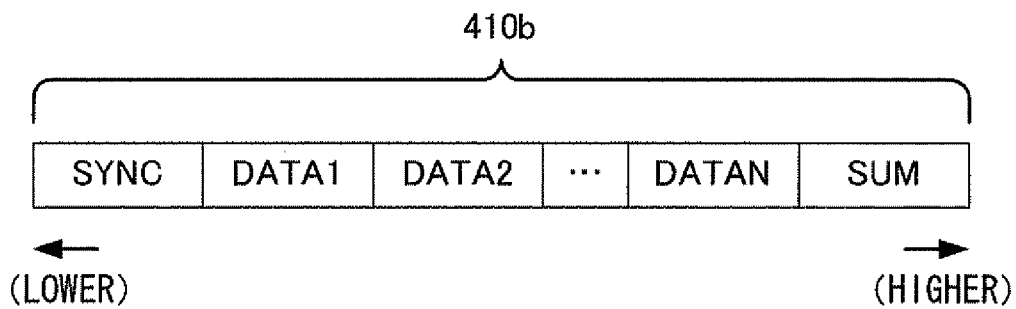

FIGS. 5A, 5B and 5C are figures showing the data structure of two packets transferred during command and data communication. It should be understood that, in the data structures shown in FIGS. 5A through 5C, the lower bits are shown at the left side, while the higher bits are shown at the right side. In this embodiment, the data transmission and reception is performed in order from the lowest bit upwards.

The data structure of the body side command packet 410*a* is shown in FIG. 5A. This body side command packet 410*a* is generated by the body CPU 103. The body side command packet 410*a* consists of four data items: SYNC, CMD, LEN, and SUM. In this embodiment, each of these data items is one byte in size.

The data item SYNC is a fixed value that indicates the start of the body side command packet 410*a*, and for example may be the value 128 (80H in hexadecimal). The data item CMD is type data that indicates the type of control command signified by the body side command packet 410*a*. For example if the data item CMD is 1, the body side command packet 410*a* is a drive command for the focusing lens 210*c*, while if the data item CMD is 2, it is a drive command for the iris diaphragm 211.

The data item LEN is a numerical value that gives the size of the body side data packet 410*a* that is paired with this body side command packet 410*a*. For example, if the data item LEN is 20, the size of the body side data packet 410*b* transmitted by the body CPU 103 following this body side command packet 410*a* is 20 bytes.

The data item SUM is a numerical value that gives a checksum for the body side command packet 410*a*. The value of SUM is determined so that the total of all of the bytes in the body side command packet 410*a* becomes a multiple of 256. For example if SYNC is 128, CMD is 2, and LEN is 5, the value of SUM is 121.

The data structure of the lens side command packet 420*a* is shown in FIG. 5B. This lens side command packet 420*a* is generated by the lens CPU 203. The lens side command packet 420*a* consists of three data items: SYNC, RCMD, and SUM, and a single dummy data item (shown in the figure as N/A). The data items SYNC and SUM are the same as in the case of the body side command packet 410*a* explained with reference to FIG. 5A, and accordingly explanation thereof will be omitted.

The data item RCMD is the CMD data in the body side command packet 410*a* that was received by the lens CPU 203 in the previous cycle of command and data communication. In other words, it is the type data received in the previous cycle of command and data communication. If the lens CPU 203 has received a body side command packet 410*a* and a body side data packet 410*b* normally, it stores the CMD data item included in that body side command packet 410*a* in a memory not shown in the figures. And, in the next cycle of command and data communication, this CMD data item is used as the RCMD data item in the lens side command packet 420*a*. In other words, the lens CPU 203 generates the lens side command packet 420*a* (response data) using the type data item (the CMD data item) received in the previous cycle of command and data communication.

It should be understood that the fact that the data item in the lens side command packet 420*a* shown in FIG. 5B corresponding to the LEN data item in the body side command packet 410*a* shown in FIG. 5A is a dummy data item (any value will be acceptable, since it is never used after being transmitted and received) is in order for it not to be necessary for the lens CPU 203 to specify the size of the lens side data packet 420*b*. This is due to the fact that the size of the lens side data packet 420*b* is the same as the size of the body side data packet 410*b*.

The data structure of the body side data packet 410*b* is shown in FIG. 5C. This body side data packet 410*b* is generated by the body CPU 103. The body side data packet 410*b* consists of two data items SYNC and SUM, and one or more data items DATA1, DATA2, ... DATAN (a total of N thereof). In other words, the data size of this body side data packet 410*b* is variable, and its size is prescribed by the data item LEN of the body side command packet 410*a*.

Explanation of the data item SYNC and of the data item SUM will be omitted, since these items are the same as the data items having the same names in the body side command packet 410*a* explained with reference to FIG. 5A. The data items DATA1 through DATAN specify parameters that accompany the body side command packet 410*a*. For example, if the body side command packet 410*a* specifies a drive command for the focusing lens 210*c*, DATA1 through DATAN are parameters that specify the drive direction for the focusing lens 210*c* and the amount by which it is to be driven. It should be understood that DATA1 through DATAN may be handled as dummy data if no parameters are required.

The lens side data packet 420*b* is generated by the lens CPU 203, and has a similar data structure to the body side data packet 410*b* shown in FIG. 5C. However there is a difference from the body side data packet 410*b*, in the feature that the data items DATA1 through DATAN are not parameters for the control command, but give information related to the lens CPU 203. For example, if the body side command packet 410*a* has contents commanding the lens CPU 203 to transmit the current iris value of the iris diaphragm 211, the data items DATA1 through DATAN of the corresponding lens side data packet 420*b* are data giving the current iris value of the iris diaphragm 211.

Explanation of the Command and Data Communication Processing on the Side of the Camera Body 100

Figure 6:
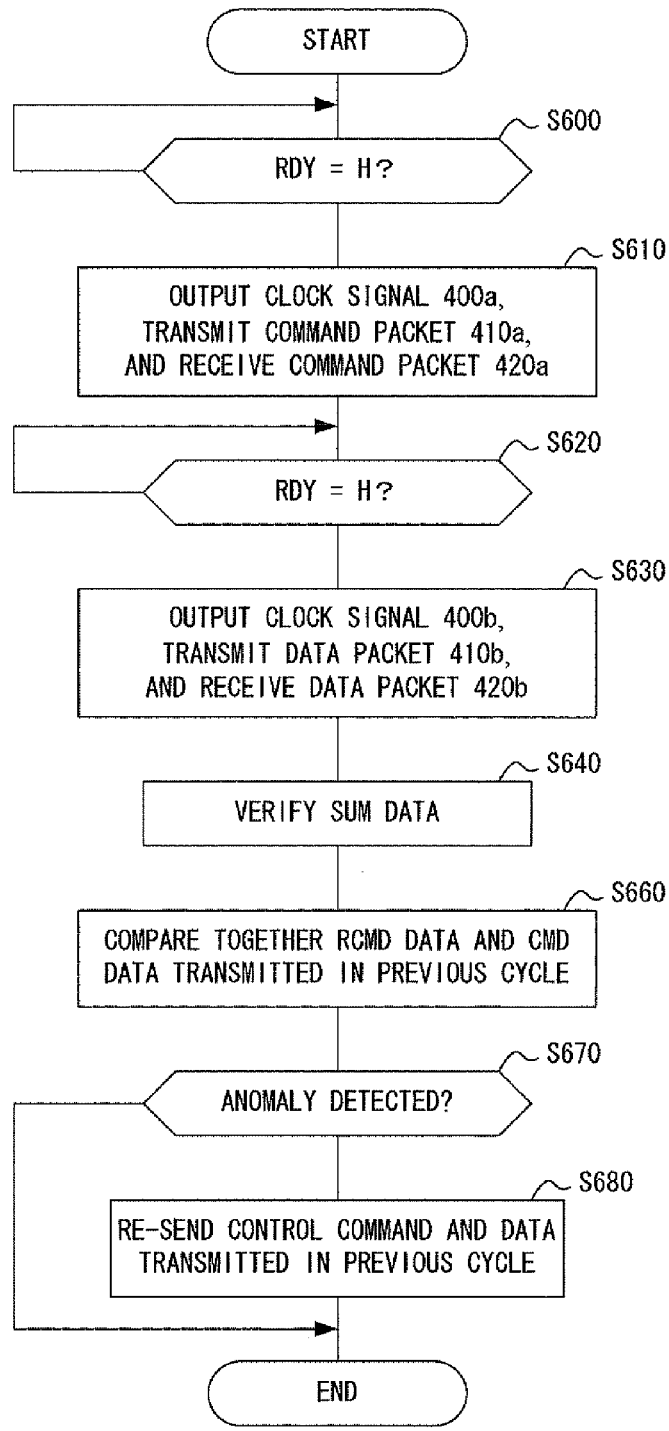
FIG. 6 is a flow chart showing the flow of processing on the side of the camera body 100 during command and data communication.

FIG. 6 is a flow chart showing the flow of processing on the side of the camera body 100 (i.e. performed by the body CPU 103) during command and data communication. The processing shown in FIG. 6 is started by the body CPU 103 writing the previously described data to an internal buffer memory of the body side first communication circuit 112, and outputting a transmit command signal to the body side first communication circuit 112.

In a first step S600, the body CPU 103 and the body side first communication circuit 112 make a decision as to whether or not the signal level of the signal line RDY is H level. If the signal level is H level, the processing of this step S600 is repeated until it becomes L level. On the other hand, if the signal level is L level, the flow of control proceeds to a step S610. In this step S610 the body CPU 103 and the body side first communication circuit 112 perform output of a clock signal 400a to the signal line CLK, transmission of a body side command packet 410a via the signal line DATAB, and reception of a lens side command packet 420a via the signal line DATAL.

In a step S620, similarly to the step S600, the body CPU 103 and the body side first communication circuit 112 make a decision as to whether or not the signal level of the signal line RDY is H level. If the signal level is H level, the processing of this step S620 is repeated until it becomes L level. On the other hand, if the signal level is L level, the flow of control proceeds to a step S630. In this step S630 the body CPU 103 and the body side first communication circuit 112 perform output of a clock signal 400b to the signal line CLK, transmission of a body side data packet 410b via the signal line DATAB, and reception of a lens side data packet 420b via the signal line DATAL.

In a step S640 the body CPU 103 performs verification of the SUM data in the lens side command packet 420a and the lens side data packet 420b that have been received by the body side first communication circuit 112. This verification of the SUM data means verification as to whether or not the sum total of the values in each packet is a multiple of 256. If the sum total of the values in each of the packets is not a multiple of 256, this means that some anomaly has occurred in the received data, for example a data error or the like. It should be understood that if such an anomaly has been detected by verification of the SUM data, for example, the body CPU 103 may re-send the data in as many further cycles of command and data communication.

In a step S660 the body CPU 103 compares together the RCMD data in the lens side command packet 420a that has been received by the body side first communication circuit 112, and the CMD data in the body side command packet 410a that was transmitted during the previous cycle of command and data communication. In the step S670 the body CPU 103 makes a decision as to whether or not the result of the comparison in the step S660 is that an anomaly has been detected. If the above described RCMD data and CMD data do not agree with one another, then the body CPU 103 decides that an anomaly has been detected, and the flow of control proceeds to a step S680. In this step S680, the body CPU 103 re-sends the control command and the data that were transmitted in the previous cycle of command and data communication, in other words the pair consisting of the body side command packet 410a and the body side data packet 410b. In other words, as processing for when an anomaly has been detected, the body side performs error processing by transmitting again the command packet (and the data packet corresponding thereto) for which there is a fear that they were not properly recognized on the interchangeable lens side although they were sent in the previous cycle of command and data communication.

It should be understood that, in this error processing performed by the body CPU 103, it would also be acceptable not only to perform the re-sending processing described above, but also to perform a warning operation by displaying a warning message to the user (for example "Communication error may have occurred") on a display unit on the camera body (for example on a rear surface LCD).

It should be understood that if no anomaly has been detected in the step S670, this processing flow terminates.

Now normally, in some period of command and data communication (i.e. in a series of cycles of command and data communication), a plurality of combinations of "command packet—data packet" are output successively. For example, when the camera body side issues requests of five types to the interchangeable lens side, the operation of transmitting and receiving five groups of "command packet—data packet" is performed between the camera body 100 and the interchangeable lens 200 as a series of cycles of command and data communication. In this case, in relation to the final command packet that is output last from the camera body side to the interchangeable lens side as well (if for example there are five groups of "command packet—data packet", the fifth and subsequent are termed the "final command packet 410a—end"), the lens CPU 203 generates RCMD data (i.e. lens side final command packet data 420a—end/final response data including this RCMD data) on the basis of this final command packet 410a—end. However, in this embodiment, the camera CPU 103 does not output the clock signal required for transmitting this lens side final command packet 410a—end that has been generated to the camera side. Due to this, in this embodiment, the lens side final command packet 410a—end is not transmitted from the lens side to the body side. And, due to this, the body CPU 103 cannot perform error checking processing in relation to the final command packet. In other words, while the lens CPU 203 does perform the processing shown in FIG. 7 in relation to the final command packet, the body CPU 103 does not perform the processing of FIG. 6 in relation thereto.

Explanation of the Command and Data Communication Processing on the Side of the Interchangeable Lens 200

Figure 7:
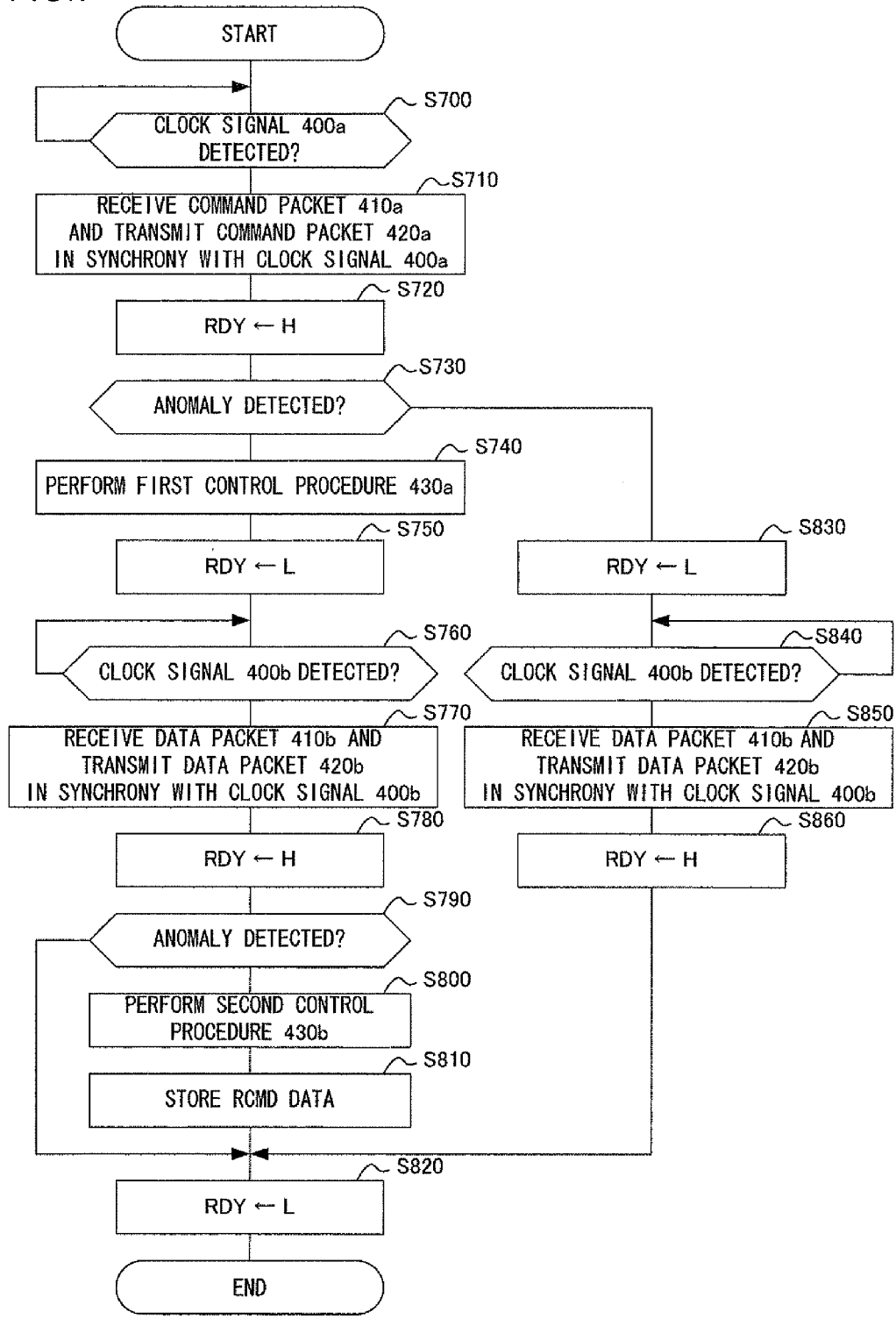
FIG. 7 is a flow chart showing the flow of processing on the side of the interchangeable lens 200 during command and data communication.

FIG. 7 is a flow chart showing the flow of processing on the side of the interchangeable lens 200 (i.e. performed by the lens CPU 203) during command and data communication. In a first step S700, the lens CPU 203 and the lens side first communication circuit 212 make a decision as to whether or not the clock signal 400a has been detected on the signal line CLK. The lens side first communication circuit 212 repeatedly executes this step S700 until the clock signal 400a is detected.

In the next step S710, the lens CPU 203 and the lens side first communication circuit 212 perform reception of a body side command packet 410a via the signal line DATAB and transmission of a lens side command packet 420a via the signal line DATAL in synchrony with the clock signal 400a outputted on the signal line CLK. Here, this lens side command packet 420a that is transmitted includes RCMD data that was stored by the step S810 in the previous cycle, as will be described hereinafter. To put this in another manner, in the series of cycles of command and data communication described above (of a plurality of combinations of "command packet—data packet"), in the background while performing reception of the body side command packet 410a of the next group, the lens CPU 203 performs transmission of a lens side command packet 420a (i.e. of response data including RCMD data generated on the basis of the CMD data in the command packet of the previous cycle).

In the next step S720, the lens CPU 203 and the lens side first communication circuit 212 raise the signal level of the signal line RDY to H level. In the step 730 the lens CPU 203 makes a decision as to whether or not an anomaly has been detected in the embody side command packet 410a that was received. This anomaly detection may, for example, be performed by verification of the SUM data as previously described. If no anomaly has been detected in the body side command packet 410a, then the flow of control proceeds to a step S740.

In this step S740, the lens CPU 203 executes a first control procedure 430a on the basis of the body side command packet 410a that was received in the step S710. In a step S750 the lens side first communication circuit 212 lowers the signal level of the signal line RDY to L level. Next in a step S760, similarly to the step S700, the lens side first communication circuit 212 makes a decision as to whether or not a clock signal 400b has been detected on the signal line CLK. The lens CPU 203 and the lens side first communication circuit 212 repeatedly execute the step S760 until the clock signal 400b is detected.

Next in a step S770, similarly to the step S710, the lens CPU 203 and the lens side first communication circuit 212 perform reception of a body side data packet 410b via the signal line DATAB and transmission of a lens side data packet 420b via the signal line DATAL in synchrony with the clock signal 400b output on the signal line CLK. In the step S780 the lens side first communication circuit 212 raises the signal level of the signal line RDY to H level.

Next in a step S790, similarly to the step S730, the lens CPU 203 makes a decision as to whether or not an anomaly has been detected in the body side data packet 410b that was received. If no anomaly has been detected in the body side data packet 410b, the flow of control proceeds to a step S800. In this step S800, the lens CPU 203 executes a second control procedure 430b on the basis of the body side command packet 410a that was received in the step S710 and the body side data packet 410b that was received in the step S770. Next in a step S810 the lens CPU 203 stores the RCMD data included in the body side command packet 410a that was received in the step S710 in a memory not shown in the figures. And then in a step S820 the lens side first communication circuit 212 lowers the signal level of the signal line RDY to L level, and communication processing terminates.

But if an anomaly in the body side command packet 410a has been detected in the step S730, the flow of control is transferred to a step S830. While the processing in the steps S830 through S860 is similar to the processing in the steps S740 through S810, processing such as the first control procedure 430a or the like on the basis of the body side command packet 410a and the body side data packet 410b that have been received is not executed. This is because it is not possible to perform normal processing if there is some anomaly in the data that has been received. If an anomaly has been detected in the step S730, the RCMD data item is stored in a memory not shown in the figures. Accordingly, when the processing on the interchangeable lens side in the one cycle of command and data communication shown in FIG. 7 has been completed, the RCMD data for the directly previous cycle of command and data communication, in other words the RCMD data that was received in the cycle previous to the previous cycle, continues to be stored in the memory not shown in the figures. And, in the next cycle of command and data communication, this RCMD data is transmitted to the body side first communication circuit 112 by the lens side first communication circuit 212. When the body side first communication circuit 112 receives this "previous to the previous RCMD data", the body CPU 103 decides that the body side command packet 410a or the body side data packet 410b has not been received normally, and accordingly sends this data again. Furthermore, if in the step S790 an anomaly has been detected in the body side data packet 410b, in a similar manner as well, the second control procedure 430b is not executed, and the RCMD data is not stored.

Explanation of the Hot Line Communication

Hot line communication is communication in one direction performed using the second transmission section 302. In this embodiment, it is arranged for this unidirectional communication to be performed by using a dedicated unidirectional information transmission path for information from the interchangeable lens 200 to the camera body 100. In other words, the first transmission section 301 includes one unidirectional information transmission path from the lens to the camera body. Hot line communication is started by the body CPU 103, in a similar manner to the command and data communication. When, among the signal lines that make up the second transmission section 302, the body CPU 103 changes the signal level of a signal line for starting communication, the lens CPU 203 detects the changing the signal level of the signal line. And, upon this detection, the lens CPU 203 detects the current position of the focusing lens 210c, and transmits data specifying that position to the body CPU 103.

The body CPU 103 within the camera body 100 is adapted to generate the clock signal at the first predetermined frequency that is used in this hot line communication (i.e. the clock signal that has already been described in connection with the command and data communication) on a second predetermined cycle. This second predetermined cycle is set to a shorter cycle than the first predetermined cycle for the command and data communication described above (for example, the second predetermined cycle may be set to be an extremely short cycle having a period 1/10 of the period of the first predetermined cycle or less). Due to this, in hot line communication, information communication from the interchangeable lens 200 to the camera body 100 is performed repeatedly at an extremely fast cycle (i.e. the second predetermined cycle) as compared to the command and data communication described above.

The body CPU 103 executes hot line communication on the predetermined cycle (i.e. on the above described second predetermined cycle). A way in which the hot line communication is different from the command and data communication is that the body CPU 103 is capable of receiving data related to the interchangeable lens 200 from the lens CPU 203 with very little processing. This is because, in contrast to the fact that it is necessary to transmit data specifying a command to the lens CPU 203 at first when data is to be received by command and data communication, transmission of data with hot line communication from the lens CPU 203 is started immediately only by changing the signal level of specific signal lines.

While in this embodiment it is arranged for clock signals of the same frequency (the clock signal of the first predetermined frequency described above) to be used by both the command and data communication and the hot line communication, this is not to be considered as being limitative of the present invention; it would also be possible for clock signals of two different frequencies to be used by these two different communication systems. For example, it would be acceptable for the frequency of the clock signal that is used by hot line communication to be lower than the above described first frequency, provided that information communication (i.e. transfer of data) between the interchangeable lens 200 and the camera body 100 is performed in sufficiently good time when hot line communication is performed.

Figure 8A:
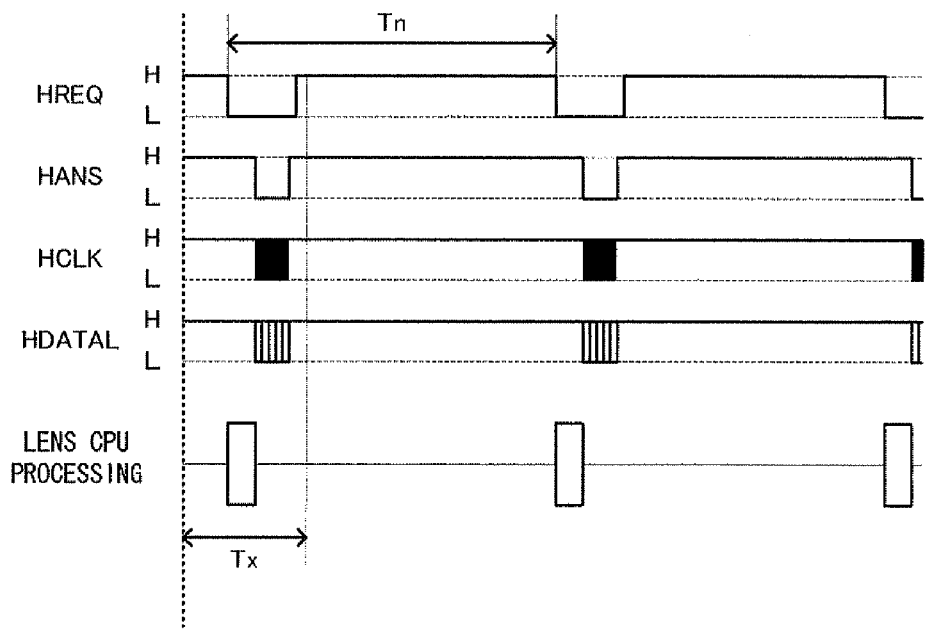
FIGS. 8A and 8B are timing charts showing an example of hot line communication.
Figure 8B:
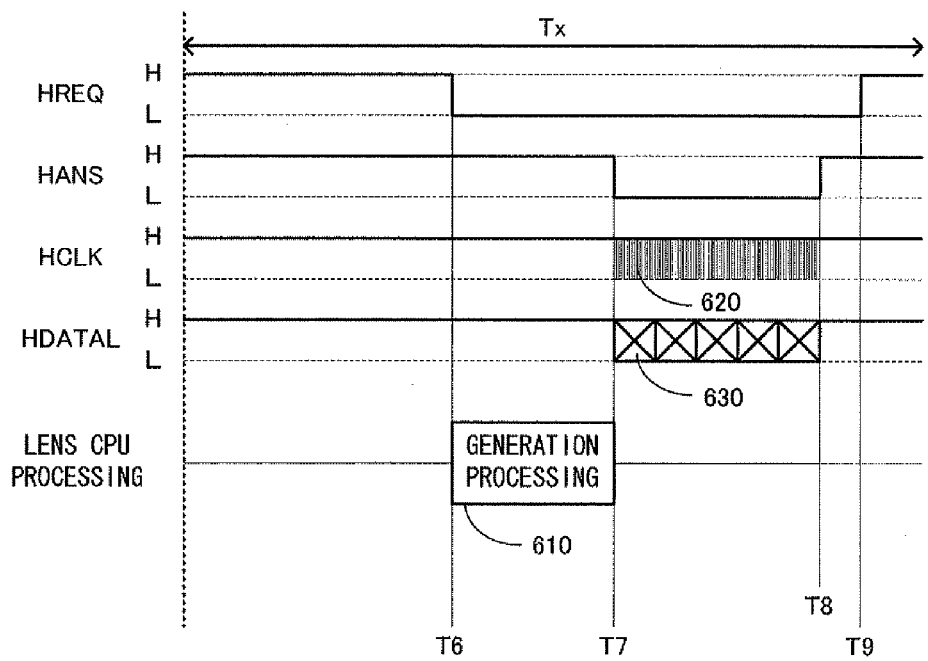

FIGS. 8A and 8B are timing charts showing an example of hot line communication. It should be understood that FIG. 8B is an enlarged figure showing one cycle Tx of FIG. 8A. In the following the procedure for hot line communication will be explained with reference to FIGS. 8A and 8B.

Hot line communication is started by the body CPU 103 in a similar manner to command and data communication. When the body CPU 103 starts hot line communication (at T6), it drops the signal level of the signal line HREQ to L level. And, in response to the signal level of the signal line HREQ going from H level to L level, the lens side second communication circuit 213 generates an interrupt indicating communication request to the lens CPU 203. Upon receipt of this interrupt, the lens CPU 203 starts executing generation processing 610 for generating the lens data. In this generation processing, the lens CPU 203 detects the current position of the focusing lens 210c, and generates position data specifying that position by writing into an internal buffer memory of the lens side second communication circuit 213.

At the end of this generation processing 610, the lens CPU 203 outputs a transmit command signal to the second communication circuit 213. This transmit command signal is a signal that specifies a command to be transmitted for the position data that has been generated. And, upon input of this transmit command signal, the lens side second communication circuit 213 drops the signal level of the signal line HANS from H level to L level (at T7).

In response to this change of the signal level of the signal line HANS from H level to L level, the body side second communication circuit 113 outputs a clock signal 620 to the signal line HCLK. In this embodiment, the position data is a two byte integer giving the current position of the focusing lens 210c in the range from 0 to 65535. Accordingly, the clock signal 620 is a signal having two pulses.

The lens side second communication circuit 213 transmits a position data signal specifying the position data to the body side second communication circuit 113 via the signal line HDATAL, in synchrony with the clock signal 620 that is sent from the body side second communication circuit 113. The body side second communication circuit 113 receives this position data signal 630, and writes the position data specified by this signal into an internal buffer memory of the body side second communication circuit 113. Thus, the transmission and reception of the position data is performed by the body side second communication circuit 113 and the lens side second communication circuit 213. In other words, the body CPU 103 and the lens CPU 203 are capable of performing other processing during the transmission and reception of the position data.

When the transmission of the position data is completed, the lens side second communication circuit 213 raises the signal level of the signal line HANS to H level (at T8). On the other hand, in response to the completion of reception of the position data, the body side second communication circuit 113 generates an interrupt indicating communication completed to the body CPU 103. In response to this interrupt, the body CPU 103 reads out the position data that has been received from the internal buffer memory of the body side second communication circuit 113. Thereafter, the body CPU 103 sends a communication completed signal to the body side second communication circuit 113. Upon input of this communication completed signal, the body side second communication circuit 113 raises the signal level of the signal line HREQ to H level (at T9).

With the camera system according to the first embodiment of the present invention described above, the following beneficial operational effects are obtained.

(1) The lens side first communication circuit 212 receives the clock signals 400a and 400b outputted from the camera body 100. Furthermore, it receives the body side command packet 410a and the body side data packet 410b including the CMD data that specifies the type of control command, these being control command and data signals that specify a control command for the interchangeable lens 200, from the camera body in synchrony with the clock signals 400a and 400b. At this time, the lens side first communication circuit 212 transmits the lens side command packet 420 that is the response data including the RCMD data that is the CMD data received the time before (this lens side command packet 420a is the body side command packet 410a one before that was received by the lens side during communication from the camera body 100 in the previous cycle) and the lens side data packet 420b (this lens side data packet 420b is data related to the processing that was performed by the lens side in response to the body side command packet one before that was received by the lens side during communication from the camera body 100 in the previous cycle (for example, in the case of an iris diaphragm drive command, it is the driven amount by which the lens side actually drove the iris diaphragm)) to the camera body 100, in synchrony with the clock signals 400a and 400b. Since this is done, it is possible to check that the camera body 100 performed communication normally in the previous communication cycle, so that it is possible to enhance the reliability of communication.

(2) The lens CPU 203 detects if there is an anomaly in the body side command packet 410a or in the body side data packet 410b that have been received by the lens side first communication circuit 212. If an anomaly has thus been detected in the body side command packet 410a or in the body side data packet 410b that were received in the previous cycle of communication, the lens side first communication circuit 212 transmits the CMD data received in the previous to the previous cycle instead of the CMD data received in the previous cycle, with the CMD data received in the previous to the previous cycle as data that indicates the occurrence of an anomaly being included in the lens side command packet 420a. Since this is done, it is possible for the camera body 100 simply and easily to check that the previous cycle of communication was performed normally, only by comparison with the CMD data that was transmitted in the previous cycle of command and data communication.

The following variations are also to be considered as being within the scope of the present invention, and moreover one or a plurality of these variant embodiments may also be combined with the embodiment described above.

Variant Embodiment 1

In the embodiment described above, the data that is transferred in one cycle of command and data communication is divided into a command packet and a data packet. However, this is not to be considered as being limitative of the present invention. In other words, it would also be possible to apply the present invention if, in the command and data communication, it is arranged to transfer only a single data item in which the command packet and the data packet described above are integrated together, or if it is arranged to divide the data into three or more packets that are then transferred separately.

Variant Embodiment 2

In the communication processing shown in FIGS. 6 and 7, verification of the command packets and the data packets was performed and anomaly in each of the packets was checked for by using the SUM data items in the packets as checksum data. However, it would also be acceptable to arrange to perform this detection and checking for anomaly in the packets by some other method. Furthermore, "anomaly" is not to be considered as being limited to anomalies of communication. For example, if an anomaly has been detected in the control procedure, it would also be acceptable to arrange to repeat the anomalous data that indicated the anomaly, in other words the CMD data that was received in the previous to the previous cycle of command and data communication.

Variant Embodiment 3

It would also be acceptable to arrange to use data other than the CMD data that was received during the previous to the previous cycle of command and data communication as anomaly data to indicate an anomaly. For example, if the types of control command are specified by numerical values from 1 to 100, it would be acceptable to stipulate that a numerical value of 101 or greater is one that indicates an anomaly, and to arrange to repeat this type of data.

Variant Embodiment 4

Instead of the dummy data "N/A" shown in the lens side command packet 420a shown in FIG. 513, it would also be acceptable to arrange to include some other useful data. For example, it would be possible to arrange to include control result data that gives the results of the control performed by the first control procedure 430a and the second control procedure 430b during the previous cycle of communication. As examples of such control result data, there may be considered data specifying that the focusing lens 210c or the iris diaphragm 211 was driven normally, or data specifying the cause why the focusing lens 210c or the iris diaphragm 211 was not driven normally, or the like.

Variant Embodiment 5

If the CMD data that was received during the previous to the previous communication cycle is used as the RCMD data for indicating an anomaly, it becomes difficult to detect an anomaly if body side command packets 410a that include the same CMD data are transmitted repeatedly from the body side first communication circuit 112. Thus, it would also be acceptable to arrange for the body CPU 103 not to transmit repeatedly body side command packets 410a that include the same CMD data, in other words control commands and data that specify the same control command. Furthermore, it would also be acceptable to arrange to provide two kinds of type data corresponding to each type of control command. For example, it would be possible to arrange to stipulate that both the command data values "1" and "10" denote a drive command for the focusing lens 210c, and to arrange for the body CPU 103 to use these two command data values for the CMD data item alternatingly.

Variant Embodiment 6

In the embodiment described above, in a series of cycles of command and data communication, even in relation to the final cycle of command and data communication, it was arranged for the lens CPU 203 to create lens side final command packet data 420a—end from the lens side. However, in the embodiment described above, this lens side final command packet data 420a—end is not actually transmitted to the camera body 100. Because of this fact, it would also be acceptable to arrange for the lens CPU 203 not to create this lens side final command packet data 420a—end. It is possible to reduce the load upon the lens CPU 203 by arranging, in this manner, not to perform generation of data that is not particularly necessary.

Variant Embodiment 7

In the embodiment described above, in the series of cycles of command and data communication performed between the camera body 100 and the interchangeable lens 200 (command and data communication in which a plurality of combinations of "command packet—data packet" are outputted in succession), it was the case that error check processing could not be performed in relation to the last command packet 410—end (i.e. the final command packet) output from the camera body side to the interchangeable lens side. In other words, on the interchangeable lens side, the RCMD data that was generated on the basis of this final command packet 410—end (actually the lens side final command packet data 420—end that includes this RCMD data) was not output from the interchangeable lens 200. However, it would also be acceptable to arrange for communication error check processing to be performed for this final command packet on the side of the camera body 100.

In this case, in order to obtain this lens side final command packet data 420—end, it would be acceptable for the clock signal 400a described above (the final clock signal 400a—end) to be output specially from the body CPU 103 and the body side first communication circuit 112. And the lens CPU 203 and the lens side first communication circuit 212 would output the above described lens side final command packet data 420—end to the body side in response to this final clock signal 400a—end. In this case, it would be appropriate to arrange for the camera CPU 103 and the body side first communication circuit 112 to transmit to the interchangeable lens the clock signal 400a for command packet transmission and reception and the clock signal 400b for data packet transmission and reception as a set (in a similar manner to the case in normal packet communication) as shown in FIG. 4; or, alternatively, to arrange for only the clock signal 400a for command packet transmission and reception to be transmitted, without the clock signal 400b for data packet transmission and reception being transmitted.

If this is done, it is possible for error checking to be performed on the camera side in order to verify whether or not the final command packet has reliably and accurately been received by the lens side.

Variant Embodiment 8

In the embodiment described above, if the RCMD data and the CMD data do not agree with one another, as error processing that is performed by the camera body 100, processing to re-send the command data for which there is a fear that it has not been transmitted accurately to the interchangeable lens 200, and/or warning display processing and so on are performed. However, apart from these types of processing, as error processing, it would also be acceptable to perform error processing by performing the next cycle of command and data communication for the pair "command packet—data packet" that is transmitted next, after having added a correction to this data packet (i.e. after having taken into account the contents that were commanded for the interchangeable lens during the previous cycle of command and data communication). To describe this in concrete terms, suppose that for example the content of the pair "command packet—data packet" for which a communication failure has occurred is "move the focusing lens 5 mm in the direction towards the photographic subject", and that the content of the pair "command packet—data packet" that is to be transmitted next is "move the focusing lens 3 mm in the direction towards the photographic subject". In this case, command and data communication would be performed on the basis of the contents for which this communication failure occurred ("move the focusing lens 5 mm in the direction towards the photographic subject"), by correcting the contents of the command packet and data packet that was scheduled to be transmitted next (that were "move the focusing lens 3 mm in the direction towards the photographic subject") to the contents "move the focusing lens 8 mm in the direction towards the photographic subject".

Variant Embodiment 9

In the embodiment described above it is recounted that, as a blur correction mechanism, a blur correction lens is included that is shiftable so as to have a component in a direction orthogonal to the optical axis R, and that camera blur correction is performed by driving this blur correction lens. However, this is not to be considered as being limitative of the blur correction mechanism; it would also be acceptable to perform blur correction by some other method, such as by rotating (swinging) the image blur correction optical system in the pitching direction and the yawing direction of the camera system.

Provided that the specific characteristics of the present invention are not departed from, the present invention is not to be considered as being limited to the embodiments described above; other modes of realization that are considered to fall within the range of the technical concept of the present invention are also included within its scope.

What is claimed is:

1. An interchangeable lens that can be detachably fitted to a camera body, the interchangeable lens comprising:
    a clock signal reception unit that receives a clock signal outputted from the camera body;
    a control command reception unit that receives a control command and data signal from the camera body, the control command and data signal being in synchrony with the clock signal, specifying a control command for the interchangeable lens and including type data specifying a type of the control command;
    a response generation unit that generates a response data signal including the type data based on the control command and data signal that has been received; and
    a response transmission unit that transmits the response data signal to the camera body while the control command reception unit is receiving the control command and data signal from the camera body in a next communication cycle in synchrony with the clock signal received by the clock signal reception unit, wherein
    if the control command and data signal is normally received, the response generation unit generates the response data including the type data based on the type data in the normally received control command and data signal, and if the control command and data signal is not normally received, the response generation unit holds the response data that has been generated based on the normally received control command and data signal in a previous communication cycle.

2. The interchangeable lens according to claim 1, further comprising:
    an anomaly detection unit that detects if the control command and data signal received by the control command reception unit is anomalous; wherein
    if an anomaly has been detected by the anomaly detection unit in the control command and data signal that was received by the control command reception unit in an immediately previous communication cycle, the response generation unit generates the response data signal including anomaly data that specifies the anomaly, instead of the type data that was received in the immediately previous communication cycle.

3. The interchangeable lens according to claim 2, wherein:
    two of the control command and data signals that are received successively by the control command reception unit are configured to have non-coinciding type data; and
    the anomaly data is the type data received by the control command reception unit during the communication cycle immediately previous to the immediately previous communication cycle.

4. The interchangeable lens according to claim 1, further comprising:
    a control unit that performs predetermined control based on the received control command and data signal; wherein
    the response data signal includes control result data that specifies a result of control performed by the control unit based on the control command and data received by the control command reception unit during the immediately previous communication cycle.

5. The interchangeable lens according to claim 1, wherein:
    if the control command reception unit sequentially receives a plurality of the control command and data signals, the response generation unit generates a final response data signal including the type data specifying the type of a final control command and data signal among the plurality of control command and data signals; and
    the response transmission unit transmits the final response data signal to the camera body, in response to the clock signal received by the clock signal reception unit after the response generation unit has generated the final response data.

6. The interchangeable lens according to claim 1, wherein
    if the control command reception unit sequentially receives a plurality of the control command and data signals, the response generation unit does not perform generation of a response data signal based on the type data specifying the type of the final control command and data signal among the plurality of control command and data signals.

7. A camera body to which is fitted the interchangeable lens according to claim 1, comprising:
    a clock signal reception unit that transmits the clock signal to the interchangeable lens;
    a control command transmission unit that transmits the control command and data signal to the interchangeable lens in synchrony with the clock signal;
    a response reception unit that receives the response data signal from the interchangeable lens in synchrony with the clock signal; and
    a decision unit that, based on the response data signal received by the response reception unit, makes a decision as to whether or not the control command and data signal that was transmitted by the control command transmission unit during the previous communication cycle was received normally.

8. The camera body according to claim 7, wherein
    if the decision unit decides that the control command and data signal that was transmitted by the control command transmission unit during the previous communication cycle was not received normally, the control command transmission unit transmits the control command and data signal to the interchangeable lens again.

9. The camera body according to claim 7, wherein
if the control command transmission unit sequentially transmits a plurality of the control command and data signals to the interchangeable lens, the clock signal transmission unit transmits a clock signal to the interchangeable lens for receiving the response data after the transmission of the final control command and data signal of the plurality of control command and data signals.

\* \* \* \* \*